United States Patent [19]
Juola

[11] Patent Number: 5,307,371
[45] Date of Patent: Apr. 26, 1994

[54] RADIO TRANSCEIVER SYSTEM

[75] Inventor: Veli Juola, Oulu, Finland

[73] Assignee: Telenokia Oy, Espoo, Finland

[21] Appl. No.: 910,125

[22] Filed: Sep. 15, 1992

[30] Foreign Application Priority Data

Nov. 15, 1990 [FI] Finland .................................. 905666

[51] Int. Cl.⁵ ................................................. H04N 1/00
[52] U.S. Cl. ............................................ 375/1; 380/34
[58] Field of Search ....................... 380/33, 34, 38, 39, 380/40; 375/1; 379/59; 455/33.1

[56] References Cited

U.S. PATENT DOCUMENTS

| | | | |
|---|---|---|---|
| 4,174,466 | 11/1979 | Broger et al. | |
| 4,532,635 | 7/1985 | Mangulis | 375/1 |
| 4,555,805 | 11/1985 | Talbot | 380/33 X |
| 4,731,812 | 3/1988 | Akerberg | 379/61 |
| 4,841,527 | 6/1989 | Raychaudhuri et al. | 375/1 X |
| 5,034,961 | 7/1991 | Adams | 375/1 |
| 5,065,430 | 11/1991 | Torii et al. | 380/38 |

FOREIGN PATENT DOCUMENTS

| | | | |
|---|---|---|---|
| 0120718 | 10/1984 | European Pat. Off. | H04Q 7/04 |
| 0000195 | 1/1987 | Japan | 380/34 |
| 0149627 | 6/1989 | Japan | 375/1 |

Primary Examiner—Tod R. Swann
Attorney, Agent, or Firm—Cushman, Darby & Cushman

[57] ABSTRACT

A radio transceiver system is provided with transceivers for transmitting an outbound signal at least at one transmitting frequency and for receiving an inbound signal at least at one receiving frequency. Baseband signal processors are also provided for baseband processing of the outbound signal before conversion up to the transmitting frequency and of the received inbound signal after conversion down from the receiving frequency. To reduce cable laying in equipment racks and to simplify the realization of baseband frequency hopping, a bidirectional serial digital transmission channel is provided between transceivers and baseband signal processors, whereby both the inbound signal from a transceiver and the outbound signal applied to the transceiver are time-division multiplexed to said bidirectional serial digital transmission channel.

10 Claims, 1 Drawing Sheet

RADIO TRANSCEIVER SYSTEM

BACKGROUND OF THE INVENTION

The invention relates to a radio transceiver system comprising transceiver for transmitting an outbound signal at least at one transmitting frequency and for receiving an inbound signal at least at one receiving frequency, and a baseband signal processor for baseband processing of said outbound signal before conversion up to the transmitting frequency and of said inbound signal after conversion down from the receiving frequency.

SUMMARY OF THE INVENTION

The object of the invention is to reduce the need for cable laying in equipment racks for digital transceivers.

This is achieved by providing a radio transceiver system of the type disclosed in the introduction, which according to the invention is characterized in that a bidirectional serial digital transmission connection is provided between the transceiver and the baseband signal processor means, whereby both the inbound signal from the transceiver and the outbound signal applied to the transceiver are time-division multiplexed to the bidirectional serial digital transmission connection.

In the invention the same serial connection can be used both in the receiving and transmitting direction for the signalling between the radio stages and the baseband stages in transceiver systems in which the transmitting and receiving moments of the transceiver do not coincide. The connection is made bidirectional by using the same connection at different times for transmitting-direction (outbound) and receiving-direction (inbound) signals. Such a bidirectional serial transmission connection reduces the need for cable laying in the equipment racks of the transceiver system.

The invention also considerably simplifies baseband switching in systems in which frequency hopping is realized by switching baseband signals to fixed-frequency transceivers.

BRIEF DESCRIPTION OF THE DRAWING

The invention will now be described in greater detail by way of an illustrating embodiment with reference to the attached drawings, in which.

DETAILED DESCRIPTION OF THE PREFERRED EMBODIMENTS

The invention can be applied in any radio transceiver system but it is especially suitable for use in cellular digital mobile radio systems, such as the GSM mobile radio system, for realizing frequency hopping in radio communication between base stations and mobile radio stations (e.g. mobile telephones).

Figure 1:
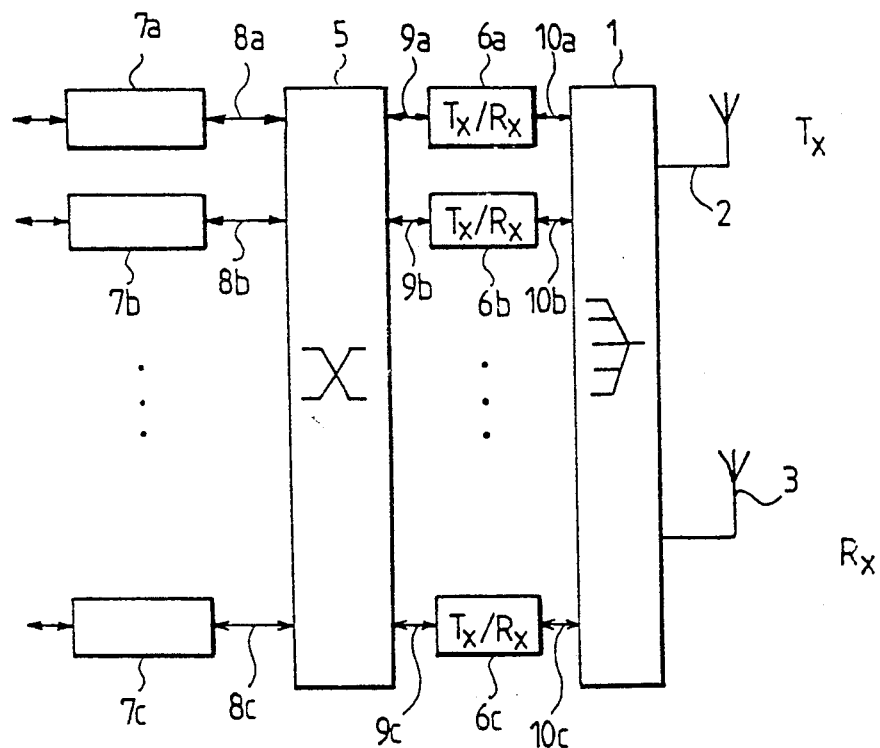
FIG. 1 shows a block diagram of a transceiver system according to the invention.

FIG. 1 shows a block diagram of a radio transceiver system according to the invention. The system comprises at least two, preferably four, radio transceiver units 6a, 6b and 6c. In the GSM system, each transceiver is full-duplex, and the duplex spacing between its receiving and transmitting RF frequencies is 45 MHz. The frequency range utilized by the system is preferably from 800 to 1,000 MHz. The transceivers 6a to 6c have mutually different fixed transmitting and receiving frequencies. Outputs 10a to 10c in the transceivers 6a to 6c are connected to a radio-frequency combiner 1, which combines the transmitters of the transceivers 6a to 6c to a common transmitting antenna 2 and the receivers to a common receiving antenna 3. Alternatively, there may be provided two receiving antennas if diversity reception is used. The radio-frequency combiner 1 contains a bandpass-type transmitting filter for the transmitter of each transceiver unit 6, the filter being tuned automatically or manually to the transmitting frequency of the particular transmitter. Receiving-frequency filters for each channel, in turn, are located in the transceiver units 6a to 6c. In practice, the signals do not thereby propagate through the combiner 1 in the receiving direction. Correspondingly, the combiner 1 contains a receiving filter for the receiver of each transceiver unit 6, which filter separates from the antenna signal a signal in the band of receiving frequencies and then amplifies it and divides it to all the receivers.

The system of FIG. 1 further comprises several baseband signal processing units 7a, 7b and 7c, which generate baseband modulating signals for the transceiver units 6a to 6c and which process the signals received and converted to the baseband frequency by the transceivers. A cross-point type switching matrix 5 is provided between the transceiver units 6a to 6c and the baseband signal processing units 7a to 7c. This matrix switches the baseband transmitting signals generated by the baseband signal processing units 7 to the different transceivers 6a to 6c in accordance with a predetermined frequency-hopping sequence in such a way that the transmitting frequency of a signal generated by a certain baseband signal processing unit 7 hops from one transmitting frequency to another. Correspondingly, the switching matrix 5 switches the signals received and converted to the baseband frequency by the transceivers to the baseband signal processing units 7a to 7c in accordance with said predetermined frequency-hopping sequence.

Figure 2:
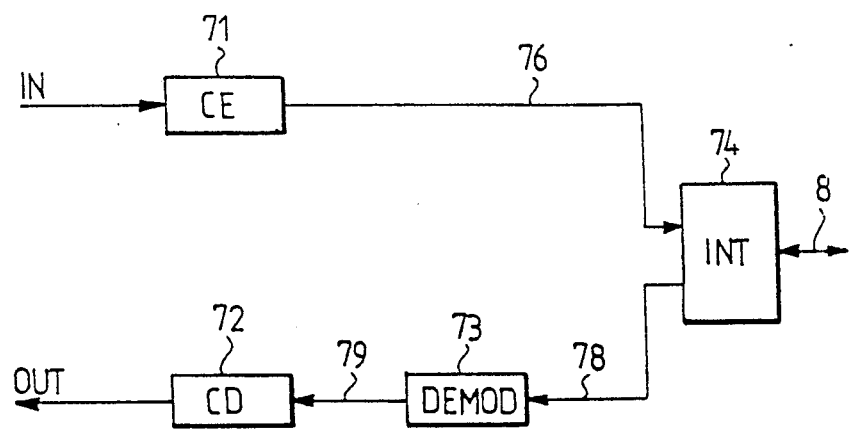
FIG. 2 shows a block diagram of the principal features of the baseband units 7a to 7c shown in FIG. 1.

In the preferred embodiment of the invention, the signal to be transmitted is a serial time-division multiplexed digital signal comprising several, preferably eight, channel time slots. FIG. 2 shows the principal functional blocks of the signal processing units 7a to 7c of FIG. 1 for the digital signal described above. The baseband processing of the signals takes place entirely in the units 7a to 7c. Generally speaking, data to be transmitted is coded and placed in a frame structure of the signal in the baseband signal processing units 7a to 7c. At the reception, the data is demodulated, the frame structure is disassembled, and decoding is carried out. More precisely, data (e.g. speech) from other parts of the radio system, such as the base station controller in the GSM system, is processed by a channel coding unit 71 before transmission. The channel coding unit 71 may perform e.g. the following functions: adaptation of transmission rate, channel coding, interleaving, encryption, assembly of TDMA frame and adjustment of transmitter power control. Within each time slot, the unit 71 transmits a burst containing the data to be transmitted in this particular time slot to an interface unit 74. The interface 74 converts the parallel data received from the unit 71 into serial form and transmits it in serial form through the switching matrix 5 to the particular transceiver 6a to 6b, the matrix 5 switching the serial base band signal in a corresponding time slot to one of the transceivers in accordance with the frequency-hopping algorithm. Correspondingly, the interface 74 receives a serial signal from a bus 8 within each receiving time slot, the serial signal containing baseband samples derived from the signal received by a transceiver 6a to 6c selected by the switching matrix 5 in accordance with the frequency-hopping algorithm. The interface 74 applies these samples in parallel form to a demodulator 73, which processes the samples. The demodulator 73 contains e.g. the following functions: sample buffering, decryption, GMSK demodulation. The demodulator 73 applies the demodulated data to a channel decoding unit 72, which performs e.g. the following functions: combining signals from different antennas when antenna diversity is used (two receiving antennas), disassembling the frame structure, breaking up interleaving, convolution decoding, block coding, checking CRC and error correction, and adaptation of transmission rate. The channel decoding unit 72 transmits the decoded data further to the other units, and, for instance, to the base station controller of the GSM system when the transceiver system is located at the base station.

In the preferred embodiment of the invention, a modulator corresponding to the demodulator 73 is provided in each transceiver 6a to 6c, in which the data to be transmitted is modulated and converted up to an appropriate radio frequency. Correspondingly, the data received at the reception is converted by the transceiver down to a baseband frequency and preprocessed for demodulation. Demodulation does not take place until in the units 7a to 7c. In addition, each transceiver 6a to 6b comprises a unit corresponding to the serial interface unit 74 for receiving the serial signal through the switching matrix 5 from the baseband unit 7a to 7c coupled to it at each particular moment and, correspondingly, for transmitting a serial signal to the same baseband unit.

Figure 3:
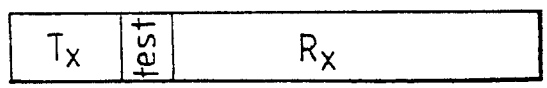
FIG. 3 illustrates the multiplexing of the time-multiplexed serial bus 8a shown in FIG. 1 into the transmitting and receiving directions.

As already mentioned above, each baseband signal processing unit 7a to 7c has a corresponding bidirectional serial bus 8a to 8c, which connects it to a respective port in the switching matrix. Similarly, each transceiver 6a to 6c is connected by a separate bidirectional serial bus 9a to 9c to a respective port in the switching matrix 5. Thus a bidirectional time-division digital connection is established between each signal processing unit 7 and the particular transceiver coupled to it in accordance with the frequency-hopping algorithm through the switching matrix 5. Preferably, the baseband signal processing units 7a to 7c are coupled to a new transceiver after each transmission or reception of a channel time slot during the guard intervals between the channel time slots. Bi-directional means that the same bus is used at different times for both transmission-direction and reception-direction time slots. A time slot complying with the GSM specification may be divided into several shorter time windows for the management of this serial bus, the windows being allocated to transmission (Tx), reception (Rx) and testing (test), as shown in FIG. 3. The illustrated time division of this serial connection is possible due to the fact that the transmitting and receiving moments of the GSM system do not coincide.

As to the frequency hopping, it is further to be noted that the GSM system comprises one time slot which is always transmitted at a fixed frequency (i.e. it is not included in the frequency hopping). The system data of the network is transmitted to mobile telephones during this time slot.

The attached drawings and the description related to them are only intended to illustrate the present invention. In its details, the system according to the invention may vary within the scope of the accompanying claims.

What is claimed is:

1. A radio transceiver system comprising:
   at least two radio transceivers, each having a pair of dedicated transmitting and receiving frequencies;
   baseband signal processing means for processing a pair of baseband outbound and inbound signals;
   a bidirectional serial digital transmission link between said at least two radio transceivers and said basband signal processing means, whereby both a baseband inbound signal from each radio transceiver to the baseband signal processing means and a baseband outbound signal from the baseband signal processing means to said each radio transceiver are transferred in a time-division multiplexed manner over said bidirectional serial digital transmission link; and
   switching means for controlling said baseband signal processing means in accordance with a predetermined frequency hopping sequence to said each radio transceiver so as to dynamically establish a serial digital signal on said bidirectional digital transmission link.

2. A system according to claim 1, wherein the switching means is a switching matrix.

3. A transceiver system according to claim 2, wherein said serial digital signal includes control signals.

4. A system according to claim 1, wherein said serial digital signal is a time-division multiplexed signal comprising eight channel time slots.

5. A transceiver system according to claim 4, wherein said time-division multiplexed signal includes control signals.

6. A system according to claim 4, wherein said baseband signal processing means, after the transmission or reception in any particular channel time slot, is assigned to communicate with different radio transceivers on the basis of said frequency hopping sequence.

7. A system according to claim 6, wherein said baseband signal processing means is assigned to a different transceiver at the end of a channel time slot, during guard intervals present between channel time slots.

8. A transceiver system according to claim 6, wherein said time-division multiplexed signal includes control signals.

9. A transceiver system according to claim 7, wherein said time-division multiplexed signal includes control signals.

10. A transceiver system according to claim 1, wherein said serial digital signal includes control signals.

* * * * *

UNITED STATES PATENT AND TRADEMARK OFFICE
CERTIFICATE OF CORRECTION

PATENT NO. : 5,307,371
DATED : April 26, 1994
INVENTOR(S) : Juola, Veli

It is certified that error appears in the above-indentified patent and that said Letters Patent is hereby corrected as shown below:

On the title page, delete "[22] Filed: Sep. 15, 1992" and insert the following:

[22] PCT Filed:     November 14, 1991

[86] PCT No.:     PCT/FI91/00340

§ 371 Date:     September 15, 1992

§ 102(e) Date: September 15, 1992

[87] PCT Pub. No.:   WO92/09149

PCT Pub. Date: May 29, 1992

Signed and Sealed this

Twenty-third Day of August, 1994

Attest:

BRUCE LEHMAN

*Attesting Officer*      *Commissioner of Patents and Trademarks*